United States Patent Office 3,002,987
Patented Oct. 3, 1961

3,002,987
HOMOPOLYMERS OF BIS(TRIMETHYLSILOXY)-METHYLVINYLSILANE
Donald L. Bailey, Snyder, N.Y., assignor to Union Carbide Corporation, a corporation of New York
No Drawing. Filed Dec. 17, 1957, Ser. No. 703,242
3 Claims. (Cl. 260—448.2)

This invention relates to a novel organosilicon compound. More particularly, the invention contemplates the provision of the specific organosilicon compound bis(trimethylsiloxy)methylvinylsilane, as represented by the following structural formula:

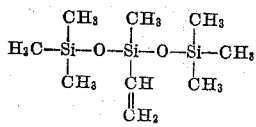

The invention is based on my discovery that the foregoing siloxane structure can be synthesized by the thermal addition of bis(trimethylsiloxy)methylsilane [heptamethyltrisiloxane] to acetylene in the presence of a platinum catalyst. In essence, the synthesis involves the formation of a reaction mixture comprising the bis(trimethylsiloxy)methylsilane, acetylene and a small amount of a platinum catalyst, followed by heating of the reaction mixture to cause the components to react under influence of the platinum catalyst to effect decomposition of the silanic hydrogen bond of the bis(trimethylsiloxy)methylsilane and addition of the resulting silicon-hydrogen free radicals to respective carbon atoms of the carbon to carbon multiple bond of the acetylene, with the production of the desired compound as an adduct of the component reactants.

The starting material bis(trimethylsiloxy)methylsilane employed in synthesizing the novel compound of my invention may be produced by any one of several conventional procedures. Thus, in accordance with one such procedure, methylhydrogensiloxane

[i.e. (—CH$_3$HSiO—)$_x$]

and hexamethyldisiloxane are equilibrated by heating in the presence of any suitable catalyst, as for example, sulfuric acid, to yield the desired starting material.

The platinum catalyst used in promoting addition of the bis(trimethylsiloxy)methylsilane to the acetylene, is preferably employed in finely-divided form either alone, or in combination with an inert support such as charcoal, asbestos, calcium carbonate, and the like, or, in the form of a multicomponent or heterogeneous catalyst consisting of platinum deposited on the gamma-allotrope of alumina (platinum-on-gamma-alumina).

It is found that the relative concentration of platinum employed for catalyzing the addition reaction is not overly critical, but rather, concentrations of the elemental metal ranging from 0.001 part to about 5 parts by weight of the reactants can be employed and satisfactory results are obtained. When the catalyst is employed in the form of a heterogeneous substance such as platinum-on-gamma-alumina, concentrations of the order of one to two percent by weight of the heterogeneous substance, containing one to two percent by weight of elemental platinum, function admirably for the purpose intended.

Generally, the reaction time and temperature of reaction are also relatively non-critical, and, in most cases, the reaction can be brought to completion with good yields of the desired adduct by heating the reactants at temperatures within the range 80–180° C. for periods ranging from two to ten (2–10) hours. In actual practice, I prefer to operate at temperatures within the range 110–150° C. It is relatively essential, however, to effect stirring or agitation of the reaction mixture throughout the time of treatment in order to establish and maintain uniform dispersion of the solid catalyst within the liquid reaction phase.

At the temperatures at which the acetylene and substituted silane starting materials react, the former reactant exists in the gas phase at atmospheric pressure. Consequently, upon heating at atmospheric pressure, the reaction mixture will tend to expand, if permitted, such that the relative concentrations of reactants are decreased. In order to establish and maintain a high concentration of the reactants, as measured in moles per liter of reactor space, for example, I prefer to charge the reactants to a closed vessel which is sealed prior to the application of thermal energy thereto. A suitable vessel for this purpose may consist of a conventional autoclave, preferably of the so-called "rocking" type to provide the degree of agitation necessary for proper catalyst dispersion.

Since the reaction mechanism of the invention is accompanied by a net decrease in volume as the desired reaction product is formed, increased pressures favor the forward reaction and are, therefore, preferred. In order to secure and insure a suitable elevated pressure during the entire reaction, the reactor can be charged initially with acetylene under pressure, and suitable additions of pressurized acetylenel can be made to the reactor during the course of the reaction as acetylene is consumed in the formation of the bis(trimethylsiloxy)methylvinylsilane. If desired, inert gases such as nitrogen can be added to the reactor to assist in maintaining reactor pressure, but the acetylene concentration is, of course, correspondingly decreased by this practice.

I prefer to employ the starting materials in such proportions as to provide an excess of acetylene over and above the stoichiometric amount required for total reaction with the bis(trimethylsiloxy)methylsilane. Thus, it has been my experience, when employing stoichiometric quantities of the reactants, that undesirable side reactions occur which preclude, to some extent, the formation of the compound of the invention. Such side reactions include, for example, formation of 1,2-di[bis(trimethylsiloxy)methylsilyl]ethane and 1,1-di[bis(trimethylsiloxy)-methylsilyl]ethane. I have found that by using acetylene in excess of its stoichiometric proportion per given quantity of bis(trimethylsiloxy)methylsilane, the tendency for such undesirable side reactions to occur is markedly decreased. While the actual excess of acetylene is not critical, in actual practice I prefer to employ the reactants in an acetylene to bis(trimethylsiloxy)methylsilane ratio of at least 2 to 1.

It is preferable to conduct the reaction between acetylene and bis(trimethylsiloxy)methylsilane within a liquid organic solvent system in which the reactants are mutually soluble to such an extent as to insure good reactive contact therebetween. Suitable solvent materials include the aliphatic and aromatic hydrocarbons such as hexane, cyclohexane, heptane, benzene, toluene, etc., as well as the cyclic aliphatic saturated and unsaturated hydrocarbon ethers such as dioxane, the furans such as tetrahydrofuran, etc., and aliphatic ketones such as acetone, and the like. The solvent should be employed in anhydrous form since the presence of moisture also tends to promote undesirable side reactions, but the presence of some moisture will not materially effect the course of the reaction. In accordance with my preferred operating technique, the reaction is conducted by slowly adding, at the desired reaction temperature, the bis(trimethylsiloxy)methylsilane to a mixture of the solvent, acetylene and platinum catalyst, and thereafter adding acetylene to the initial reaction mixture during the source of the reaction such as to maintain the desired pressure conditions within the reaction vessel.

The compound of the invention possesses numerous desirable properties which render it useful for a wide variety of applications. Thus, by way of illustration, the vinyl group bonded to a silicon atom thereof, provides a reactive site for use in the preparation of various addition products. For example, bis(trimethylsiloxy)methylchloroethylsilane can be produced by reaction of the compound with hydrogen chloride, whereas mercuric acetate may be similarly added across the unstable olefinic linkage. In addition, the compound may be blended or equilibrated with dimethyl gums and cyclic siloxanes by conventional means, to provide modified gums which can then be selectively cured through the vinyl groups by means of a catalyst such as di-tertiary butyl peroxide to produce silicone elastomers.

The compound finds its widest use in the production of polymeric materials, in that, by virtue of the single reactive vinyl group present therein it can be readily polymerized by heating in the presence of a peroxide catalyst to a homopolymer whose molecules consist of carbon chains containing pendant bis(trimethylsiloxy) methylsilyl groups. Such homopolymers may, in turn, be equilibrated with silicone oils to produce modified oils. Furthermore, the compound can be copolymerized with certain monoolefinic organic compounds to yield copolymers having particularly desirable properties. For example, the compound can be copolymerized with N-vinyl pyrrolidone to produce a copolymer whose molecules consist of carbon chains having pendant pyrrolidone and bis(trimethylsiloxy)methylsilyl groups. Such copolymers are found to be water soluble and are useful as emulsifying agents in silicone oil-water systems. The bis(trimethylsiloxy) methylvinylsilane compound of the invention can also be copolymerized with acrylonitrile to produce copolymers which are characterized by solubility in certain liquid polar nitrogen-containing compounds such as dialkylformamides, from which solutions clear films can be formed. Lastly, the compound can be copolymerized with chlorotrifluoroethylene to prepare dimethyl silicone oil-soluble copolymers. The latter type of copolymers have been found to be useful as blending materials for silicone oils to improve the load carrying capacities of the same.

Typical copolymers of bis(trimethylsiloxy)methylvinylsilane and N-vinyl pyrrolidone, chlorotrifluoroethylene and acrylonitrile as well as processes for their production are described and claimed in copending U.S. applications Serial Nos. 574,086, now U.S. Patent No. 2,928,806, and 574,106, now U.S. Patent No. 2,909,548, which were filed on March 27, 1956 and U.S. Patent 2,820,798.

It is believed that my invention may be best understood by reference to the following examples describing the foregoing principles and procedures as applied to the actual preparation of the novel compound of the invention:

EXAMPLE I

*Preparation of bis(trimethylsiloxy)methylsilane*

Bis(trimethylsiloxy)methylsilane was prepared by the following procedure: In a three liter flask fitted with a stirrer and a reflux condenser were placed 180 grams (3.0 moles) of methylhydrogenpolysiloxane, 972.0 grams (6.0 moles) of hexamethyldisiloxane and 17.3 grams of sulfuric acid. Two layers formed: one containing the acid and the other containing the siloxanes. This mixture was stirred at room temperature for a period of six hours, transferred to a separatory funnel, the acid layer removed and the siloxane layer washed successively with three 250 milliliter portions of water, 200 milliliters of a 1–2 percent aqueous sodium bicarbonate solution, and two 250 milliliter portions of water. The siloxane material so obtained was dried over magnesium sulfate and, after removal of the magnesium sulfate, fractionally distilled at atmospheric pressure. There was recovered 585 grams of unreacted hexamethyldisiloxane that was contained in the fraction which distilled at from 87° to 101° C. and 303 grams of bis(trimethylsiloxy)methylsilane (B.P. 141–143° C., $n_D^{25}$ 1.3795).

EXAMPLE II

*Preparation of bis(trimethylsiloxy)methylvinylsilane*

Bis(trimethylsiloxy)methylvinylsilane was prepared by the following procedure: Into an 800 milliliter rocking autoclave were placed 200 milliliters of anhydrous tetrahydrofuran and 2.0 grams of a heterogeneous mixture of finely-divided platinum and gamma alumina containing 2 percent by weight of platinum. The autoclave was heated to 130° C. and pressurized by admitting acetylene until a pressure of 265 p.s.i.g. was reached. One hundred sixty grams (0.72 mole) of bis(trimethylsiloxy)methylsilane were then injected into the reaction mixture at the rate of 10 milliliters per 5 minutes. The acetylene pressure was maintained at from about 195 p.s.i.g. to about 265 p.s.i.g., and, to this end, acetylene was added to the autoclave as required by the decrease in pressure due to the reaction of the acetylene. The reaction was carried out over a period of 2.5 hours, and the cessation in the consumption of acetylene (as evidenced by the constancy of the pressure in the reactor) indicated that the reaction was completed after that time. The contents of the autoclave were decanted, the autoclave rinsed with 100 milliliters of acetone, and the resulting solutions were combined and filtered to remove any suspended catalyst. The solvent, which consisted of a mixture of tetrahydrofuran and acetone, was then removed from the filtrate by distillation. The residue from this distillation was fractionally distilled through a 45-plate Podbielniak column. By this procedure, there was obtained 117.5 grams of bis(trimethylsiloxy) methylvinylsilane having the following physical properties:

Boiling point at 8.8 mm_____ 48° C.
Refractive index ($n_D^{25}$)_____ 1.3942
Density ($d_4^{25}$)_____ 0.8749

The yield of bis(trimethylsiloxy)methylvinylsilane was 66 percent by weight.

The identity of this latter compound was established by elementary analysis and by its infrared spectrum. Elementary analysis of this substance gave the following results:

| Content of— | Found (percent by weight) | Calculated for $C_9H_{24}O_2Si_3$ (percent by weight) |
| --- | --- | --- |
| Carbon | 38.9 | 43.6 |
| Hydrogen | 9.3 | 9.7 |
| Silicon | 33.6 | 33.9 |

The infrared spectrum of the compound served to identify the following structural groups: Si—CH=CH₂, Si—CH₃ and Si—O—Si. The residue in the Podbielniak column consisted of 20.5 grams of a material having an $n_D^{25}$ value of 1.4052–1.4132 which was found to consist primarily of 1,2-di[bis(trimethylsiloxy)methylsilyl]ethane and 1,1-di[bis(trimethylsiloxy)methylsilyl] ethane.

EXAMPLE III

*Preparation of bis(trimethylsiloxy)methylvinylsilane*

In an 800 milliliter rocking autoclave were placed 100 grams (0.618 mole) of bis(trimethylsiloxy)methylsilane and 10 grams of a heterogeneous mixture of finely-divided platinum and gamma alumina containing 2 percent by weight of platinum. The autoclave was presured to 130 p.s.i.g. with acetylene gas. The acetylene pressure was increased to 245 p.s.i.g. over a period of 45 minutes. The liquid contents of the bomb were then removed via a pipette and the autoclave was rinsed with 50 milliliters of acetone. The resulting solutions were combined and filtered to remove any suspended catalyst. The solvents were removed by distillation and the liquid residue was fractionally distilled through a 45-plate Podbielniak column. The fractions thus obtained were:

(1) 16.8 grams of bis(trimethylsiloxy)methylvinylsilane (B.P. 50–53° C. at 10 mm. of Hg, $n_D^{25}$ 1.3932–1.3930) which represented an 11 percent yield.

(2) 4.90 grams of an unidentified material (B.P. 74–110° C., $n_D^{25}$ 1.3940–1.4040).

(3) 63.8 grams of residue that was composed mostly of 1,2-di[bis(trimethylsiloxy)methylsilyl]ethane and 1,1-di[bis(trimethylsiloxy)methylsilyl]ethane.

EXAMPLE IV

*Preparation of homopolymer of bis(trimethylsiloxy)-methylvinylsilane*

A homopolymer of bis(trimethylsiloxy)methylvinylsilane was prepared as follows: In a twelve inch test tube that had been previously flushed with argon were placed 20.0 grams of bis(trimethylsiloxy)methylvinylsilane and 0.2 gram of di-t-butyl peroxide. The tube was stoppered and placed in an oil bath that was maintained at 125° C. for 16 hours. The product had a viscosity of 49.5 centistokes. The product was stripped of 2.5 grams of unpolymerized monomer by heating at 120° C. at 0.35 mm. of Hg and the residue so obtained was 11.5 grams of a polymer that had a molecular weight of 1798.

This application is a continuation-in-part of my prior U.S. application Serial No. 574,104 of March 27, 1956, which has been abandoned in favor of the present application.

Having thus described the subject matter of my invention, what it is desired to secure by Letters Patent is:

1. A homopolymer of bis(trimethylsiloxy)methylvinylsilane.

2. A liquid homopolymer of bis(trimethylsiloxy)methylvinylsilane.

3. A liquid homopolymer of bis(trimethylsiloxy)methylvinylsilane having a molecular weight of about 1798.

References Cited in the file of this patent

UNITED STATES PATENTS

| | | |
|---|---|---|
| 2,645,628 | Hurd | July 14, 1953 |
| 2,835,690 | Prober | May 20, 1958 |
| 2,853,503 | Bailey et al. | Sept. 23, 1958 |

FOREIGN PATENTS

| | | |
|---|---|---|
| 524,470 | Belgium | Dec. 15, 1953 |

OTHER REFERENCES

Burkhard: application S.N. 11,091, filed Aug. 18, 1949, pub. Oct. 14, 1952, in 663, O.G. 571.

Wagner et al.: "Ind. and Eng. Chem.," vol. 45, Feb. 1953, pp. 367–73 (pp. 370–71 only needed).